United States Patent [19]

Ledwith

[11] Patent Number: 4,483,054
[45] Date of Patent: Nov. 20, 1984

[54] METHOD FOR MAKING A DRUM ROTOR

[75] Inventor: Walter A. Ledwith, North Palm Beach, Fla.

[73] Assignee: United Technologies Corporation, Hartford, Conn.

[21] Appl. No.: 441,451

[22] Filed: Nov. 12, 1982

[51] Int. Cl.³ .................. B21K 3/04; B23P 15/02; B23P 15/04
[52] U.S. Cl. .................. 29/156.8 R; 29/445; 29/DIG. 26; 29/DIG. 48; 228/113; 416/198 A; 416/200 A; 416/201 R; 416/219 R
[58] Field of Search .......... 416/198 A, 200 A, 201 R, 416/219 R; 29/156.8 R, 445, DIG. 26, DIG. 48; 228/113

[56] References Cited

U.S. PATENT DOCUMENTS

| | | | |
|---|---|---|---|
| 1,535,417 | 4/1925 | Huff | 416/219 R |
| 2,025,171 | 12/1935 | Ljungstrom | 416/219 R |
| 2,445,154 | 7/1948 | Reed | 416/221 |
| 2,461,402 | 2/1949 | Whitehead | 416/201 |
| 2,619,318 | 11/1952 | Schaer | 416/198 A X |
| 2,637,521 | 5/1953 | Constantine et al. | 29/156.8 R X |
| 2,639,119 | 5/1953 | Greenwald | 29/156.8 R |
| 2,848,190 | 8/1958 | Barr | 416/219 R X |
| 3,625,634 | 12/1971 | Stedfeld | 416/198 A |
| 3,688,371 | 9/1972 | Koff | 416/198 A |
| 3,692,429 | 9/1972 | Redding | 29/156.8 R |
| 3,700,353 | 10/1972 | Ortoland | 416/199 |
| 3,842,475 | 10/1974 | Clasper et al. | 228/113 X |
| 3,894,324 | 7/1975 | Holzapfel et al. | 29/156.8 R |
| 4,016,636 | 4/1977 | Schneider et al. | 29/156.8 R X |
| 4,033,501 | 7/1977 | Ambrose, Jr. et al. | 228/113 X |
| 4,060,883 | 12/1977 | Coulon et al. | 29/156.8 R |
| 4,086,690 | 5/1978 | Bernasconi | 29/156.8 R |
| 4,277,225 | 7/1981 | Dubois et al. | 416/198 A |

FOREIGN PATENT DOCUMENTS

| | | | |
|---|---|---|---|
| 2408641 | 8/1975 | Fed. Rep. of Germany | 416/200 A |
| 976790 | 3/1951 | France | 416/219 R |
| 1230202 | 9/1960 | France | 416/198 A |
| 71207 | 6/1979 | Japan | 416/201 R |
| 87909 | 4/1958 | Netherlands | 416/198 A |
| 1028554 | 5/1966 | United Kingdom | 416/198 A |
| 757747 | 8/1980 | U.S.S.R. | 416/219 R |

Primary Examiner—Mark Rosenbaum
Assistant Examiner—Ronald S. Wallace
Attorney, Agent, or Firm—Stephen E. Revis

[57] ABSTRACT

A one-piece cylindrical drum of a drum rotor has a plurality of enlarged, axially spaced-apart, annular rim portions through which axial blade root slots are machined. The slots are curved along their length about an axis located radially outwardly of the rim. The rotor is preferably made from a plurality of bonded together cylinder-like sections. After bonding the sections together the curved blade root slots are machined using a circular broach.

2 Claims, 6 Drawing Figures

METHOD FOR MAKING A DRUM ROTOR

DESCRIPTION

1. Technical Field

This invention relates to rotors for gas turbine engines and the like, and more particularly, to drum rotors.

2. Background Art

Drum rotors are well known in the gas turbine engine art. Basically, a drum rotor comprises a one-piece, cylinder-like structural member or "drum" which takes the place of at least two rotor disks. The drum has a plurality of spaced-apart, enlarged annular rim portions, one for each stage of rotor blades to be carried by the drum. Blade root slots are disposed in each of these enlarged rim portions for carrying the rotor blades.

A typical drum rotor is shown in U.S. Pat. No. 3,249,293, wherein each enlarged annular rim portion of the drum includes a single annular or circumferential blade root slot into which the blades of that particular stage are inserted.

German Pat. No. 1,503,634 shows a drum-type compressor rotor which carries only two compressor stages. In this case the blade root slots in the enlarged rim portions of the drum are of the more conventional axially extending slots, one slot being formed in the rim for each blade. FIG. 1 herein shows the prior art drum rotor of that German patent. As can be seen from the drawing, each slot 26, 28 is machined along a straight line 27 or 30, respectively. The slots of each of the two stages are angled in a manner which permits broaching of the slots of each stage along straight lines without the broach interfering with other portions of the drum. It is apparent that the drum rotor design of FIG. 1 is useful for drum rotors with only two or three stages.

It is desirable to be able to manufacture drum rotors with many stages on a single, unitary drum, with each stage having a plurality of blades and axial as opposed to circumferential blade root slots. Axial slots often permit a lighter weight drum rotor construction, depending upon aerodynamic considerations. Prior art designs do not admit of this combination of features.

DISCLOSURE OF INVENTION

One object of the present invention is a drum rotor having a one-piece or unitary drum with axially extending blade root slots.

Another object of the present invention is a drum rotor having a unitary drum with any number of rotor stages, each stage having axially extending blade root slots.

Accordingly, in a drum rotor a one-piece drum has a plurality of axially spaced-apart enlarged annular rim portions which extend radially outwardly beyond cylinder-like walls of the drum and through which axially extending, circumferentially spaced-apart slots are formed which are curved along their length about an axis located radially outwardly from the rim.

In accordance with one embodiment of the present invention, the curved slots are formed using a circular broach which allows cutting the axially extending slots in an efficient manner in each of the rim portions without the tool interfering with other portions of the drum. This contrasts with the drum rotor of hereinabove referred to German Pat. No. 1,503,634 shown in FIG. 1, wherein the axial slots are milled or broached along straight lines. This restricts the number of stages in the unitary drum of the drum rotor to two or three.

It is most preferable to form the unitary drum by joining together a plurality of short drum sections, each section including an enlarged rim portion for carrying one stage of blades. Cylindrical wall portions extend axially outwardly from the enlarged rim portions. The wall portions of adjacent sections extend toward each other and have their ends abut each other at the same radius. These abutting ends may be inertia-bonded or welded together. The curved axial blade root slots are subsequently broached into each rim portion. Note that if the axial blade root slots were formed prior to joining the individual drum sections they could be machined by a number of conventional methods, including straight broaching. However, processes for joining the drum sections subsequent to machining the axial blade root slots result in tolerance buildups due to inaccuracies of the joining operation, whereby the slots of each stage do not end up properly aligned relative to other stages. This problem is eliminated when the blade root slots are machined after the drum sections are joined, as taught by the present invention.

The foregoing and other objects, features and advantages of the present invention will become more apparent in the light of the following detailed description of preferred embodiments thereof as shown in the accompanying drawing.

BEST MODE FOR CARRYING OUT THE INVENTION

Figure 1:
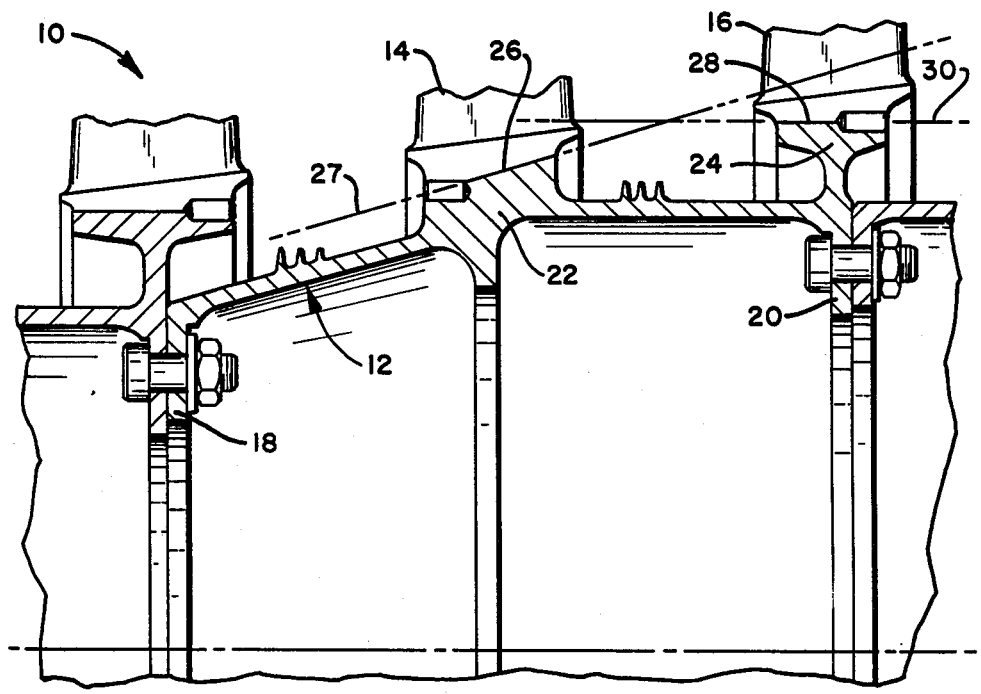
FIG. 1 is a drum rotor according to a prior art design.

FIG. 1 shows a drum rotor 10 in accordance with the teachings of the prior art, more specifically German Pat. No. 1,503,634. The drum rotor 10 comprises a drum 12 carrying two stages of rotor blades 14, 16. The drum 12 has radially inwardly extending annular flanges 18, 20 at each end, and enlarged radially outwardly extending annular rim portions 22, 24, one for each rotor stage carried by the drum 12. The blade root slots 26 in the enlarged rim portion 22 are axially oriented and are machined by conventional means, such as by a straight broach, along straight lines, such as the line 27, which do not interfere with other portions of the drum 12, such as the enlarged rim portion 24. Similarly, the blade root slots 28 for the enlarged rim portion 24 may be machined by straight broaching along lines similar to the line 30, which also does not interfere with any other portion of the drum rotor 10.

It is apparent that this prior art design limits a unitary or one-piece drum of a drum rotor to carrying only two or three rotor stages having axial blade root slots. A drum rotor of more than three stages must be formed from a plurality of drum rotors bolted together as shown in FIG. 1.

Figure 2:
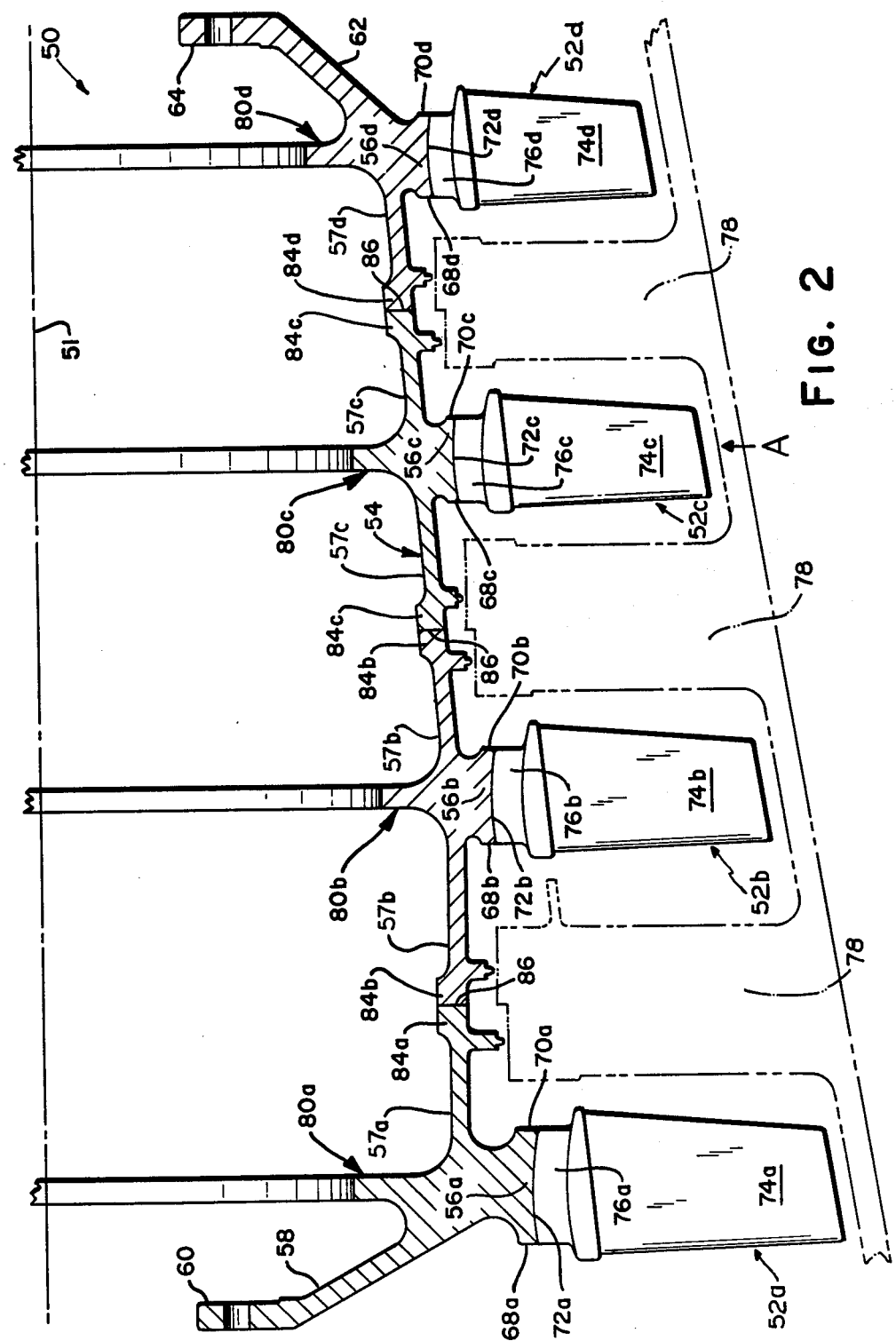
FIG. 2 is a sectional view of a portion of a drum rotor in accordance with the present invention.

FIG. 2 shows a drum rotor 50 according to an exemplary embodiment of the present invention. The drum rotor 50 has an axis 51 and four rotor stages generally represented by the numerals 52a, 52b, 52c, and 52d, respectively. The drum rotor 50 comprises a cylinder-like unitary drum 54 having four enlarged annular rim portions 56a through 56d, one for each rotor stage 52a through 52d, respectively. Cylinder-like walls 57 are integral with and interconnect adjacent enlarged rim portions 56. The enlarged rim portions 56a through 56d each extend radially outwardly beyond the cylindrical walls 57 and have forwardly facing surfaces 68a through 68d, respectively, and rearwardly facing surfaces 70a through 70d, respectively. The forward end of the drum 54 includes a forwardly extending radially inwardly tapering conical wall 58 integral with the enlarged rim portion 56a. The wall 58 has a radially inwardly extending annular flange 60 at its upstream end for attachment to an upstream rotor stage or shaft which is not shown and which is not a part of the drum 54. Similarly, the rearward end of the drum 54 includes a radially inwardly tapering conical wall 62 integral with and extending rearwardly from the enlarged rim portion 56d. The conical wall 62 has a radially inwardly extending annular flange 64 at its downstream end for attachment to a downstream rotor stage or other rotating engine part (not shown) which is also not a part of the drum 54.

Figure 3:
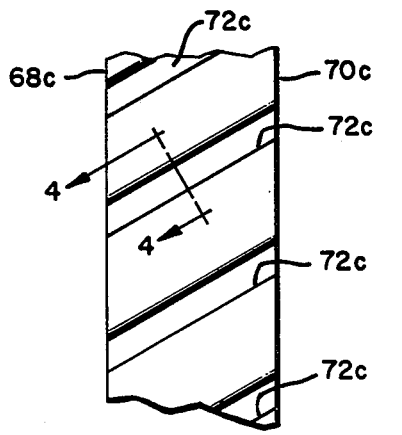
FIG. 3 is a view in the direction A of FIG. 2 with blades removed showing the blade root slots of one stage of the drum rotor.
Figure 4:
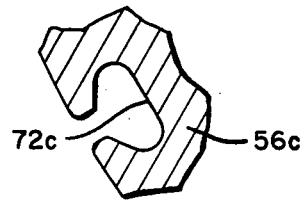
FIG. 4 is a sectional view taken along the line 4—4 in FIG. 3.

As best seen in FIGS. 2, 3 and 4, each enlarged rim portion 56a through 56d includes blade root slots 72a through 72d, respectively, extending generally axially from a rearwardly facing surface 70 to a forwardly facing surface 68 through its respective rim portion 56. Each slot 72 is defined by a planar shape rotated about a fixed axis (i.e., the axis 105 of the slot cutting tool as described hereinbelow with respect to FIG. 5) located radially outwardly of its respective enlarged rim portion 56, and is therefore curved along its length. In this embodiment the planar shape is a conventional dovetail shape as best shown in FIG. 4; but other shapes may be used. Disposed within the blade root slots 72a through 72d are blades 74a through 74d, respectively having similarly curved and shaped roots 76a through 76d. Vanes 78, shown in phantom, are disposed between adjacent blade stages.

In this embodiment the drum 54 is comprised of four drum sections 80a through 80d, respectively, which are fabricated separately and then joined together. Each section 80 includes one of the four enlarged rims 56. The blade root slots 72 are not formed until after the sections 80a through 80d are joined. As best shown in FIG. 2, each section 80a through 80d includes either one or two cylindrical wall sections 57a through 57d, respectively. Each wall section 57 extends generally axially outwardly from and is integral with its respective enlarged rim portion 56. Each cylindrical wall section 57a through 57d has an end 84a through 84d, respectively, which is integrally joined, as at locations 86, to a confronting end 84 of the wall section of the next adjacent drum section 80, such as by welding, inertia-bonding, or other suitable means.

Figure 6:
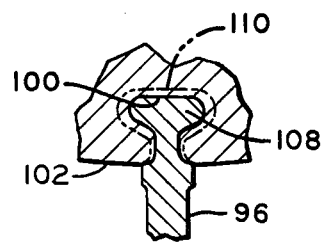
FIG. 6 is a sectional view taken along the line 6—6 in FIG. 2.
Figure 5:
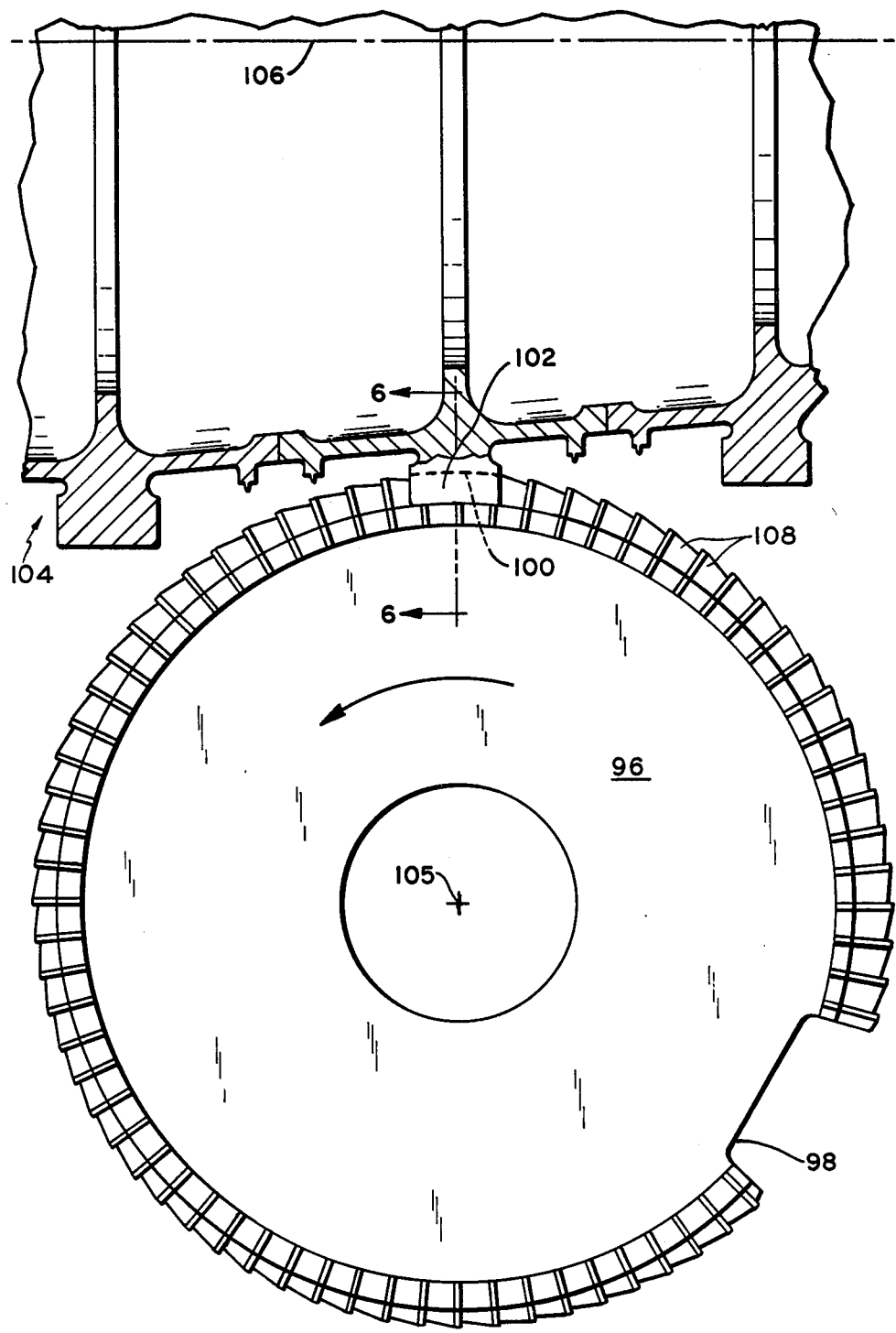
FIG. 5 is a simplified representation of a circular broach shown cutting a blade root slot in a drum rotor in accordance with the teachings of the present invention.

After the drum sections 80 are joined together, the curved blade root slots 72 are machined into the enlarged rims 56 such as by broaching using a circular broach. Circular broaches are well known in the art and are described, for example, in "Broaching—Tooling and Practice" by Horris E. Linsley, pp. 83–85, The Industrial Press, New York (1961). The size (i.e., outer diameter) of the circular broach is selected such that it cuts the blade root slots without coming into contact with other structural features of the drum, such as the enlarged rim portions on either side of the rim portion being cut. In FIG. 5 a circular broach 96 having a loading slot 98, is shown cutting a blade root slot 100 in the enlarged rim portion 102 of a drum rotor 104. The slot 100 will be curved along its length in the plane of the broach. In this example the circular broach 96 rotates about its axis 105 in a plane containing the axis 106 of the drum rotor 104 such that the slots 100, except for their curvature, are parallel to the drum axis 106. In FIG. 6 the cutting tooth 108 of the broach 96 is shown within the workpiece or rim portion 102. The slot 100 is not yet completed since additional teeth on the broach have yet to cut through the workpiece. More than one broach may be required to complete a slot if diameter limitations on the broach do not permit it to contain a sufficient number of teeth. The shape of the blade root slot when it is finished is shown as a phantom outline 110.

Although the invention has been shown and described with respect to a preferred embodiment thereof, it should be understood by those skilled in the art that other various changes and omissions in the form and detail thereof may be made therein without departing from the spirit and the scope of the invention.

I claim:

1. In a method for manufacturing a drum rotor comprising a unitary cylinder-like drum having an axis and a plurality of axially spaced apart, enlarged annular rim portions, each rim portion including a radially outwardly extending portion having forwardly and rearwardly facing annular surfaces, each rim portion including a plurality of circumferentially spaced apart blade root slots extending therethrough from said forwardly facing to said rearwardly facing surface, the steps of:

fabricating a plurality of separate drum sections, each section including at least one of said enlarged annular rim portions without said blade root slots therethrough, each drum section having an axis and including a cylinder-like wall extending axially outwardly from said enlarged rim portion;

joining said drum sections together to form said unitary cylinder-like drum without blade root slots by inertia bonding or welding the end of said cylinder-like wall of one of said drum sections to the end of a cylinder-like wall of an adjacent drum section, said joined ends being at the same radius and said adjacent drum sections having a common axis; and after said step of joining, machining a plurality of circumferentially spaced apart curved blade root slots through each of said rim portions from said forwardly to said rearwardly facing surface using a circular broach, each of said slots being machined by rotating said broach about an axis located radially outwardly of said rim portion, whereby each of said slots is curved along its length in the plane of the broach.

2. The method according to claim 1 wherein the step of machining slots comprises machining dovetail shaped slots.

* * * * *